(12) United States Patent
Takagaki

(10) Patent No.: US 12,660,805 B2
(45) Date of Patent: Jun. 23, 2026

(54) LIQUID SPREADER

(71) Applicant: ROBUSTUS CO., LTD., Ota (JP)

(72) Inventor: Tatsuro Takagaki, Ota (JP)

(73) Assignee: ROBUSTUS CO., LTD., Ota (JP)

( * ) Notice: Subject to any disclaimer, the term of this patent is extended or adjusted under 35 U.S.C. 154(b) by 550 days.

(21) Appl. No.: 17/925,954

(22) PCT Filed: Sep. 29, 2020

(86) PCT No.: PCT/JP2020/036906
§ 371 (c)(1),
(2) Date: Nov. 17, 2022

(87) PCT Pub. No.: WO2022/070255
PCT Pub. Date: Apr. 7, 2022

(65) Prior Publication Data
US 2023/0200368 A1 Jun. 29, 2023

(51) Int. Cl.
*A01M 7/00* (2006.01)
*A01M 21/04* (2006.01)

(52) U.S. Cl.
CPC .......... *A01M 7/0035* (2013.01); *A01M 7/006* (2013.01); *A01M 7/0064* (2013.01); *A01M 7/0082* (2013.01); *A01M 21/043* (2013.01)

(58) Field of Classification Search
CPC .. A01M 7/0064; A01M 21/043; A01M 7/006; A01M 7/0035; A01M 7/0082;
(Continued)

(56) References Cited

U.S. PATENT DOCUMENTS 2,581,678 A * 1/1952 Malin ................. A01M 7/0064
239/722
4,186,879 A * 2/1980 Kinder ................ A01M 7/0064
280/415.1
(Continued)

FOREIGN PATENT DOCUMENTS

CN 205813379 U 12/2016
CN 107079900 A 8/2017
(Continued)

OTHER PUBLICATIONS

Dec. 15, 2020 International Search Report issued in International Patent Application No. PCT/JP2020/036906.
(Continued)

*Primary Examiner* — Kevin Edward Schwartz
(74) *Attorney, Agent, or Firm* — OLIFF PLC

(57) ABSTRACT
An herbicide spreader is capable of changing a spreading width of an herbicide. The herbicide spreader includes: a pair of upper shafts facing with a predetermined interval therebetween in a front and rear direction; a pair of side frames on left and right sides of both the upper shafts; a pair of operation handles connected to both side frames; a spray nozzle mounted to the upper shafts; wheels mounted to both side frames; and a cover sheet for covering portions of a frame main body formed with the pair of upper shafts and both side frames except the bottom. The side frames and the operation handles are rotatably connected to the upper shafts, and opening and closing angle between the left and right side frames is variable and adjusted by operating the pair of operation handles in a direction for bringing them close to or away from each other.

10 Claims, 11 Drawing Sheets

(58) Field of Classification Search
CPC ......... B05B 12/29; B05B 12/36; B05B 12/32; B05B 12/34; B05B 15/68
USPC .......................... 239/722, 288, 157; 118/504
See application file for complete search history.

(56) References Cited

U.S. PATENT DOCUMENTS

| | | | | | | |
|---|---|---|---|---|---|---|
| 5,248,090 | A | * | 9/1993 | Williamson | ........ | A01M 7/0064 239/168 |
| 5,310,116 | A | * | 5/1994 | Broyhill | .................. | B05B 12/34 239/288 |
| 5,361,991 | A | * | 11/1994 | Baran, Jr. | ........... | A01M 7/0064 239/165 |
| 5,361,992 | A | * | 11/1994 | Broyhill | .............. | A01M 7/0064 239/104 |
| 5,370,321 | A | * | 12/1994 | Bianco | ................. | A01C 15/008 239/685 |
| 5,398,874 | A | * | 3/1995 | Dailey | ................ | A01M 7/0064 239/288 |
| 5,673,854 | A | * | 10/1997 | Kinder | ................ | A01M 7/0064 239/164 |
| 8,132,741 | B2 | * | 3/2012 | Tremblay, Jr. | ...... | A01M 7/0064 239/142 |
| 2008/0098956 | A1 | * | 5/2008 | Serfozo | ................... | B05B 12/29 118/504 |

FOREIGN PATENT DOCUMENTS

| | | | |
|---|---|---|---|
| CN | 206808510 | U | 12/2017 |
| CN | 209680351 | U | 11/2019 |
| CN | 210076398 | U | 2/2020 |
| JP | S60-031367 | U | 3/1985 |
| JP | H03-32991 | A | 2/1991 |
| JP | 2006-271246 | A | 10/2006 |
| JP | 2007259781 | A | * | 10/2007 |
| JP | 2009-142168 | A1 | | 7/2009 |
| JP | 2012-231685 | A | | 11/2012 |
| JP | 3208348 | U | * | 1/2017 |
| JP | 2019-165696 | A | | 10/2019 |
| KR | 87-9261 | U | | 7/1987 |
| KR | 1998-026021 | A | | 7/1998 |

OTHER PUBLICATIONS

Dec. 15, 2020 Written Opinion issued in International Patent Application No. PCT/JP2020/036906.
Dec. 15, 2020 Decision to Grant issued in Japanese Patent Application No. 2020-552930.
Nov. 7, 2022 Written Opinion issued in Korean Patent Application No. 10-2022-7015820.
May 22, 2023 Office Action issued in Korean Patent Application No. 10-2022-7015820.
Nov. 22, 2023 Search Report issued in Australian Patent Application No. 2020470450.
Nov. 4, 2024 Written Opinion issued in Korean Patent Application No. 10-2022-7043812.
Aug. 7, 2025 Written Decision on Registration issued in Korean Patent Application No. 10-2022-7043812.
Dec. 6, 2023 Extended Search Report issued in European Patent Application No. 20956185.1.
May 28, 2024 Office Action issued in Chinese Patent Application No. 202080101531.3.
May 28, 2024 Translation of Search Report issued in Chinese Patent Application No. 202080101531.3.
Oct. 1, 2025 Office Action issued in Indonesian Patent Application No. P00202303512.
Mar. 10, 2025 Office Action issued in Vietnamese Patent Application No. 1-2023-01531.

* cited by examiner

LIQUID SPREADER

TECHNICAL FIELD

The present invention relates to a liquid spreader for spreading a liquid such as an herbicide on soil, and in particular, relates to a liquid spreader suitable for weeds between crops.

BACKGROUND ART

In an agricultural field for cultivating crops, weeds easily grow between the planted crops, and high growth of the weeds between the crops may cause poor growth of the crops or host pests and diseases. Conventionally, weeds have been removed to prevent the weeds from growing between the crops, and there has been widely known a method of spreading, from a spray nozzle, an herbicide filled in a liquid solution tank of a power sprayer or a manual sprayer carried by a weed removing worker.

For example, Patent Literature 1 proposes a liquid spreader equipped with a gantry-shaped splash guard including an upper frame and a pair of left and right side walls, an arm-shaped handle for moving the splash guard on soil, and a spray nozzle mounted to the upper frame, wherein a herbicide sprayed from the spray nozzle is spread downward toward the lower side of a space surrounded between the left and right side walls. Here, the upper frame has a framework structure in which a pair of left and right vertical ribs and a pair of front and rear transverse ribs are joined, and each of the side walls has a panel-like structure in which a cover plate is mounted to a side frame. The upper portions of the side frames are formed with a pair of arm portions, and these arm portions are inserted into the corresponding transverse ribs of the upper frame and tightened with fixing screws, respectively. In this structure, loosening the fixing screws and sliding the arm portions inserted into the transverse ribs enables adjustment of the distance between the two side walls.

In the liquid spreader having the structure described above, in order to spread an herbicide between crops, the distance between the two side walls is adjusted to the width between the crops. Then, an operator carries a power spreader or a manual spreader on his or her back and holds the handle, and moves the splash guard along between the crops while spraying the herbicide in the liquid solution tank from the spray nozzle. In this operation, since the side walls of the splash guard protect the crops, the herbicide sprayed from the spray nozzles is spread only on the weeds growing between the crops, thereby preventing the crops from being covered with the herbicide.

CITATION LIST

Patent Literature

Patent Literature 1: JP-A-2009-142168

SUMMARY OF INVENTION

Technical Problem

In the liquid spreader disclosed in Patent Literature 1, the splash guard includes the pair of left and right side walls, and the distance between these side walls can be adjusted using the fixing screws, and thus adjusting the distance between the side walls to the maximum width between the crops in advance enables spreading of the herbicide over the entire area in the width direction between the crops. However, the width between the crops along which the splash guard moves often varies from row to row of the crops, which makes it difficult to accurately spread the herbicide to the areas near the roots of ail the crops. Furthermore, the distance between the crops in the width direction does not always extend straight with constant width, and in some crop rows, the width dimension may vary along the direction of movement. During moving the splash guard, when suddenly encountering the distance between the crops which is narrow in the width direction, the operator cannot move the splash guard further ahead. On the other hand, the distance between the crops which is greatly wide in the width direction prevents the operator from spreading the herbicide to the areas near the roots of the crops due to the narrow spreading width of the herbicide.

In the event of change in the width between the crops, the operator may stop moving the splash guard once and loosen the fixing bolts to readjust the distance between the side walls. However, in such a case, each time the distance between the crops in the width direction varies, the operator has to interrupt the work of removing the weeds, in other words, stop moving the splash guard for readjustment using the fixing bolts. This makes the work of removing the weeds complicated and requires a lot of time to accurately remove the weeds in the areas near the roots of the crops.

Furthermore, in the liquid spreader disclosed in Patent Literature 1, the pair of left and right side walls formed on the splash guard functions as a shield cover to prevent splashing of the herbicide. However, if the wind blows during the work of removing the weeds, the herbicide sprayed from the spray nozzle may be blown by the wind and flown from the front and rear of the splash guard, which may adhere to the surrounding crops or the operator.

The present invention has been made in view of the circumstances of the prior art, and an object is to provide a liquid spreader capable of easily changing a spreading width of a liquid.

Solution to Problem

In order to achieve the object described above, the present invention provides a liquid spreader comprising: a pair of upper shafts extending in a Left and right direction having a predetermined interval therebetween in a front and rear direction; a pair of side frames provided on both left and right sides of the pair of upper shafts; a pair of operation handles for moving the pair of side frames; a spray nozzle mounted to the pair of upper shafts and spraying a liquid into a space surrounded between the pair of side frames; and a cover sheet for covering at least the pair of side frames, wherein the pair of side frames and the pair of operation handles are integrally connected to each other and rotatably supported on the pair of upper shafts, respectively, and an opening and closing angle between the pair of side frames is variable and adjusted by an operation of the pair of operation handles in a direction for bringing the pair of operation handles close to or away from each other around points of rotation with the pair of upper shafts.

In the liquid spreader having the structure described above, an operator holds the pair of operation handles, approaches the pair of side frames toward the roots of the crops, and moves them along between the crops while spreading a liquid from the spray nozzles, thereby spreading the liquid only to an area surrounded by both the side frames while protecting the crops from the liquid sprayed from the spray nozzles. During spreading the liquid, when the distance in the width direction between the crops positioned forward of the traveling direction varies, the operator operates both the operation handles in the direction for bringing them close to or away from each other to rotate the operation handles and thus the side frames about the connections with the upper shafts. This enables easy adjustment of the opening and closing angle between both the side frames in accordance with the width of the crops.

Furthermore, in the case where the structure described above further comprises a cover sheet for covering a front region surrounded by one of the upper shafts which is positioned on a front side and the side frames and a cover sheet for covering a rear region surrounded by the other one of the upper shafts which is positioned on a rear side and the side frames, not only the left and right sides of the liquid spreader but also the front and rear sides thereof are covered with the cover sheets. This suppresses flow of the liquid, for example caused by the wind, from the front and rear sides of the liquid spreader, thereby reliably preventing the liquid blown by the wind and then leaked from the front and rear sides of the liquid spreader from adhering to the crops and the operator.

Still further, in the structure described above, in the case where the cover sheet further covers a space between the pair of upper shafts, even in a windy work environment, the liquid blown by the wind is prevented from splashing toward the surrounding area from the top portion, thereby reliably preventing the surrounding crops and the operator from being exposed to the liquid.

Still further, in the case where the structure described above further comprises an angle fixing unit capable of fixing an opening and closing angle between the pair of side frames at a predetermined angle, the angle fixing unit can reliably prevent both the side frames from being closed too much inwardly and then failing down, or from being opened too much outwardly and then causing damage to the crops. Furthermore, releasing the fixing of the opening and closing angle between the pair of side frames by the angle fixing unit enables the opening and closing angle of the pair of side frames to be changed freely, for example, in accordance the width between crops.

Preferably, in the structure described above, in the case where the angle fixing unit includes a bracket fixed to each of the pair of upper shafts, a guide hole formed in the bracket and extending in a circular arc shape about corresponding one of the points of rotation, and a fixing screw inserted into the guide hole to fix each of the pair of operation handles to the bracket, it is possible to easily restrict the opening and closing angle between both the side frames.

In the case where the guide hole is a slit consecutive along the circular arc shape, it is possible to realize not only traveling in a state where the opening and closing angle between both the side frames is fixed by tightening of the fixing screws, but also traveling in a state where the fixing screws are loosened and thus the change in relative positions of the fixing screws and guide holes due to an operation for rotating both the operation handles. This enables the operator to easily adjust the opening and closing angle between both the side frames while making the herbicide spreader travel.

Preferably, in the structure described above, in the case where each of the side frames includes a rotation shaft rotatably connected to corresponding one of the upper shafts, a pair of vertical, shafts extending downward from both ends of the rotation shaft, and a connection member connecting lower ends of the vertical shafts, and a plurality of wheels is mounted to the connection member, it is possible to make both the side frames travel smoothly using the plurality of wheels.

In the case where the connection member includes protrusions protruding further than the rotation shaft in the front and rear direction, and the plurality of wheels is mounted to the protrusions, respectively, the operator can easily view the wheels protruding further than the rotation shafts in the front and rear direction during spreading the herbicide. Using the wheels as positioning markers during spreading the herbicide allows the operator to check, for example, whether the opening and closing angle between the side frames is suitable for the width between the crops.

In the structure described above, in the case where a cover auxiliary plate for covering a gap between a surface on which the liquid is spread and the connection member is mounted to each of the pair of side frames, it is possible to enhance the shielding effect to the liquid by both the side frames.

In the structure described above, in the case where the cover sheet is an agricultural vinyl film and the agricultural vinyl film is fixed to the upper shafts and the side frames at any point using a plurality of stoppers, it is possible to mount the cover sheet to the upper shafts and both the side frames by utilizing agricultural vinyl films which are commonly used for agricultural plastic greenhouses.

Furthermore, in the case where the upper shafts and the side frames have the structures which correspond to poles of agricultural plastic greenhouses, it is possible to use locking clips which are agricultural materials for fixing agricultural vinyl films to the poles of the agricultural plastic greenhouses as the stoppers. This enables easy stretching and re-stretching of the cover sheet with familiar materials.

Advantageous Effects of Invention

According to the liquid spreader of the present invention, it is possible to change a spreading width of a liquid.

DESCRIPTION OF EMBODIMENTS

Figure 1:
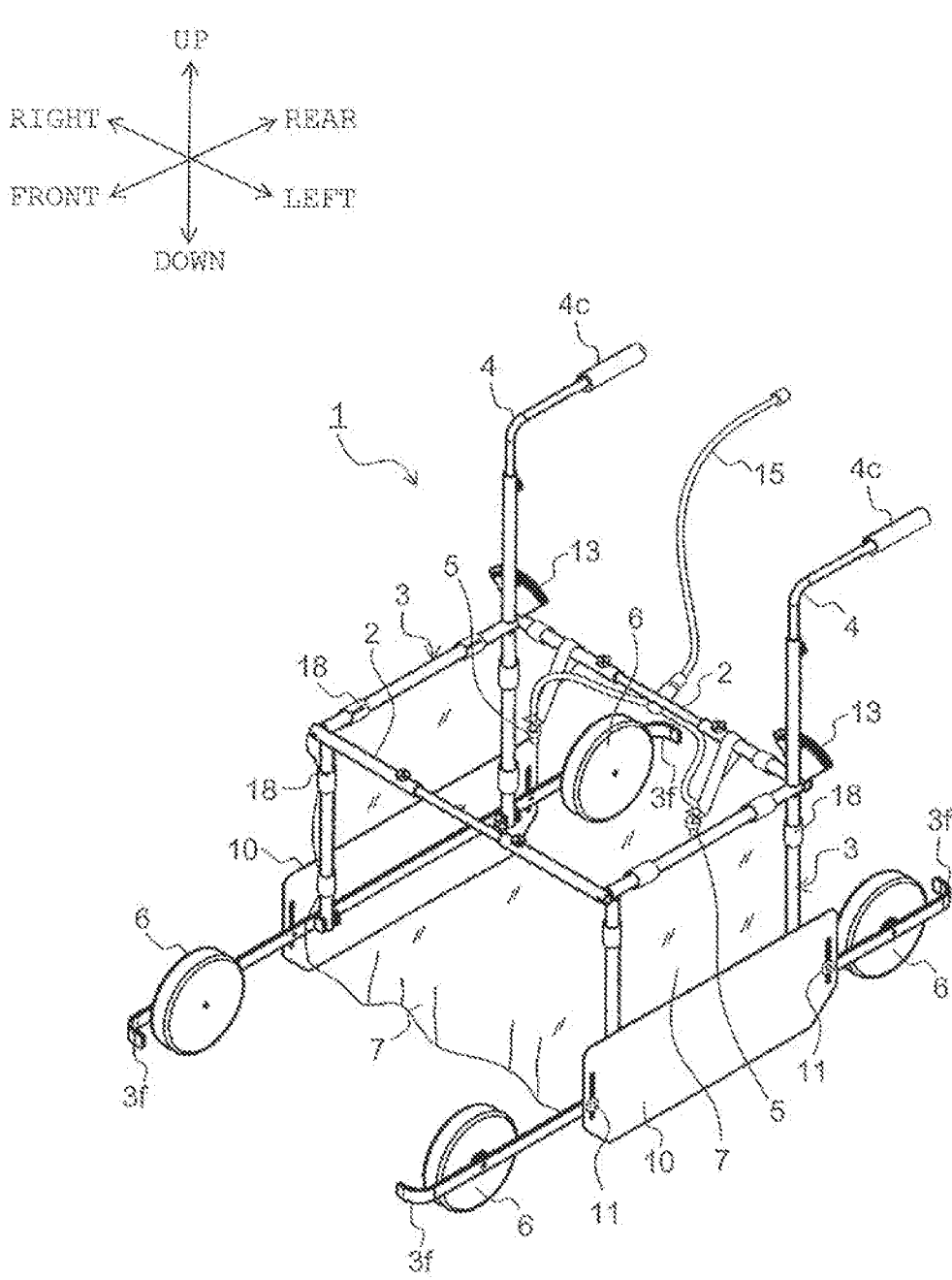
FIG. 1 is a perspective view of appearance of an herbicide spreader according to an embodiment of the present invention.
Figure 2:
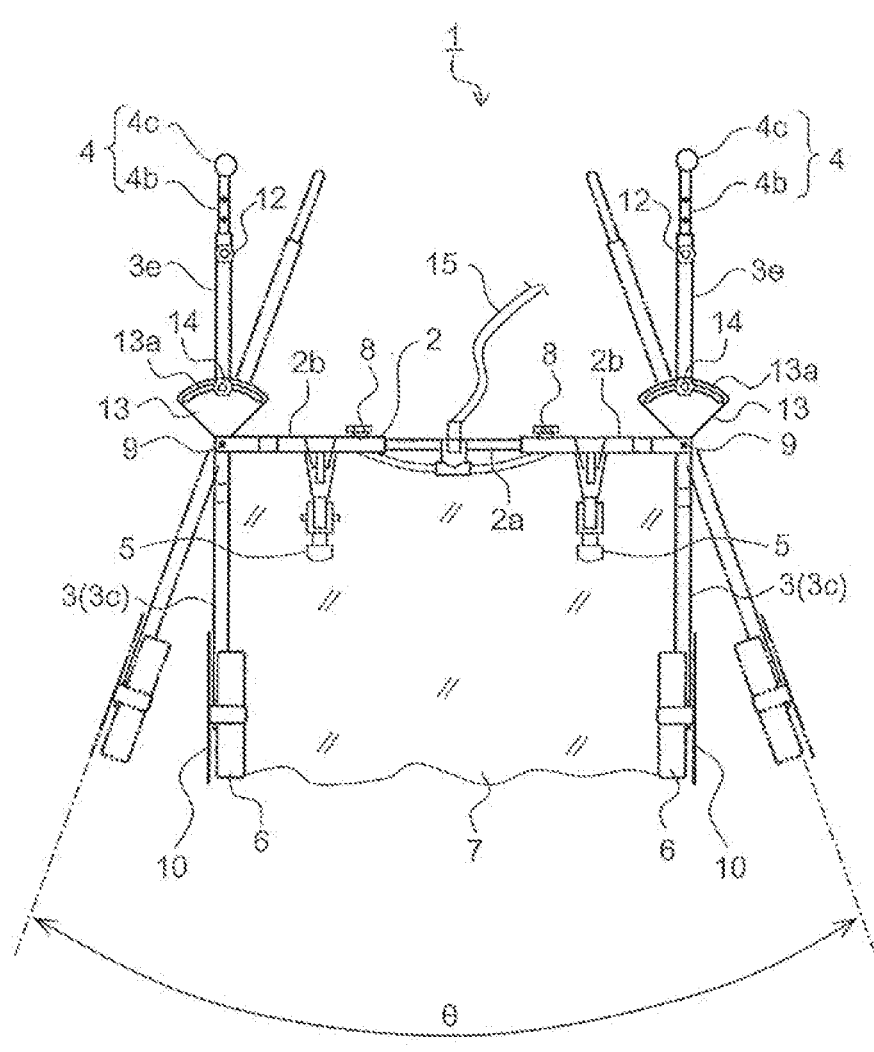
FIG. 2 is a plan view of the herbicide spreader.

Embodiments of the present invention will be described with reference to the drawings. FIG. 1 is a perspective view of appearance of an herbicide spreader according to an embodiment of the present invention, FIG. 2 is a plan view of the herbicide spreader, FIG. 3 is a plan view of the herbicide spreader, and FIG. 4 is a side view of the herbicide spreader.

Figure 3:
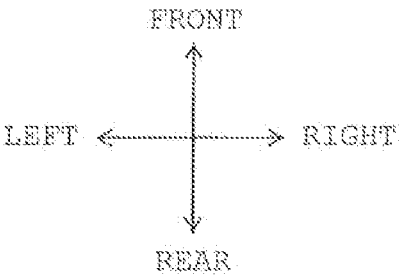
FIG. 3 is a plan view of the herbicide spreader.
Figure 3:
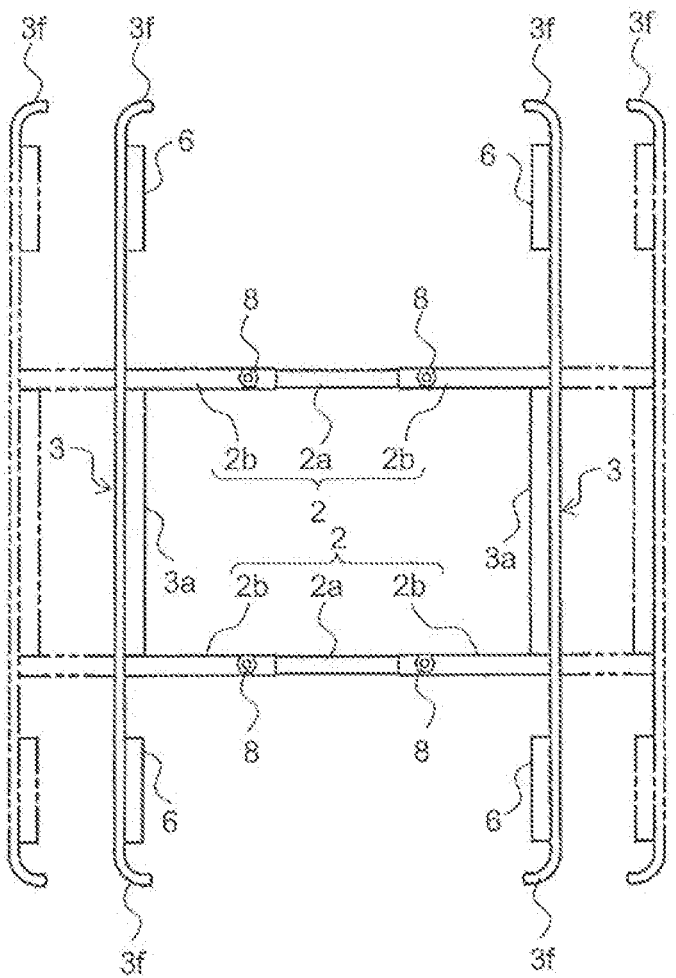
Figure 4:
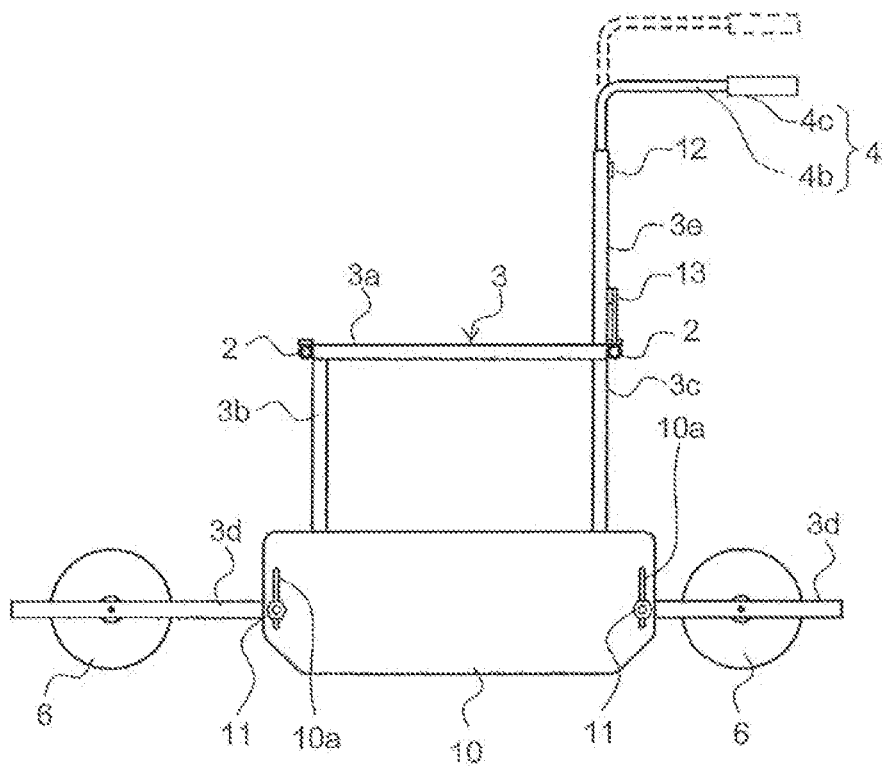
FIG. 4 is a side view of the herbicide spreader.

As illustrated in FIG. 1 to FIG. 4, an herbicide spreader 1 according to the present embodiment includes a pair of upper shafts 2 arranged in parallel having a predetermined interval therebetween, a pair of side frames 3 provided on both sides of the upper shafts 2, a pair of operation handles 4 for moving the side frames 3 on soil, a pair of spray nozzles 5 mounted to the upper shafts 2, four wheels 6 mounted to the side frames 3, a cover sheet 7 for covering portions of a frame main body formed with the pair of upper shafts 2 and side frames 3 except the bottom of the frame main body, and a cover auxiliary plate 10 for closing a gap between the portion of the cover sheet 7 which covers corresponding one of the side frames 3 and the soil. In FIG. 3 and FIG. 4, the spray nozzles 5 and the cover sheet 7 are not illustrated.

Each of the upper shafts 2 has a rod-shaped body obtained by inserting a large-diameter pipe 2b made of an aluminum or stainless-steel round pipe into both ends of a small-diameter round bar 2a made of aluminum. The small-diameter round bar 2a and the large-diameter pipe 2b are fixed to each other by tightening a fixing screw 8. Loosening the fixing screws 8 and sliding the small-diameter round bars 2a and the large-diameter pipes 2b enables adjustment of the total length of the upper shafts 2 (length in the left and right direction) (see FIG. 3). In the following, the front and rear direction and the left and right direction are defined based on the direction in which the herbicide spreader 1 is viewed from the direction of the operation handle 4, respectively.

Each of the side frames 3 includes a rotation shaft 3a extending in the front and rear direction, a vertical shaft 3b fixed to the front end of the rotation shaft 3a and extending vertically downward, a vertical shaft 3c fixed to the rear end of the rotation shaft 3a and extending vertically downward, a connection member 3d fixed to the lower ends of both the vertical shaft 3b and the vertical shaft 3c and extending in the front and rear direction, and an operation shaft 3e integrally connected to the upper end of the vertical shaft 3c. The rotation shaft 3a is a round bar made of aluminum, and the vertical shaft 3b and the vertical shaft 3c are round pipes made of aluminum. The rotation shaft 3a is provided with tapped holes in the center of both ends thereof, into which the upper shafts 2 are inserted and screwed with bolts 9 in a manner allowing the upper shafts 2 to rotate. Thus, the pair of upper shafts 2 and the pair of rotation shafts 3a form the upper frame having a rectangular shape in plan view, and the upper frame has a framework structure whose form does not change.

The connection member 3d is a plate material made of aluminum, and both ends thereof are formed as protrusions which protrude in the front and rear direction further than the rotation shaft 3a. The protrusions of the connection member 3d are provided with the wheels 6 for traveling, respectively. The herbicide spreader 1 includes the total of four wheels 6 on the front, rear, left and right, respectively. In the pair of connection members 3d, ends of each of the protrusions are curved toward the direction in which the other opposing one of the connection members 3d is positioned, in other words, curved inwardly at about 90° to form circular-arc shaped guard portions 3f. For example, while the herbicide spreader 1 is traveling forward, each of the guard portion 3f functions to prevent the crops from entering between the pair of connection members 3d, in other words, a region where the herbicide is to be spread, and also prevent the crops from being rolled into the wheels 6.

The cover auxiliary plate 10 is mounted to the connection member 3d using the fixing screws 11 so as to close a gap between the connection member 3d and soil. The auxiliary cover plate 10 is provided with slits 10a extending in the vertical direction, via which the fixing screws 11 are tightened with the connection member 3d. This enables adjustment of the mounting position of the cover auxiliary plate 10 in the vertical direction.

The operation shaft 3e is welded and fixed to the upper end of the vertical shaft 3c which is provided at the rear end of the side frame 3 to be integrally connected thereto, so that the operation shaft 3e is straightly consecutive to the vertical shaft 3c along the axial direction thereof. The operation shaft 3e is a round or square pipe made of aluminum, and has the diameter which is the same as that of the vertical shaft 3c.

Each of the operation hardies 4 includes an L-shaped operation portion 4b inserted into the upper end of the operation shaft 3e to be integrated therewith, and a grip portion 4c mounted to the base end of the operation portion 4b. The operation portion 4b is a round or square bar made of aluminum, and has the diameter smaller than that of the operation shaft 3e. The operation portion 4b is inserted into the operation shaft 3e and fixed by a fixing screw 12, and thus loosening the fixing screw 12 and sliding the operation portion 4b enables adjustment of the height position of the operation handle 4 (see FIG. 4).

On both ends of the upper shaft 2 provided at the rear side, fan-shaped brackets 13 are fixed. Each of the brackets 13 is provided with a guide hole 13a. The guide hole 13a is a slit which is consecutive in a circular arc shape about the bolt 9 serving as a point of rotation of the side frame 3 and the operation handle 4. Tightening a fixing screw 14 inserted in the guide hole 13a with respect to the operation shaft 3e enables fixing of the operation handle 4 to the bracket 13 in a releasable manner.

Here, operating to rotate the operation handle 4 with the fixing screw 14 loosened without removing the fixing screw 14 from the operation shaft 3e enables adjustment of an opening and closing angle θ between the side frames 3 integrated into the operation handles 4. For example, as illustrated with the two-dotted line in FIG. 2, when the operator operates the operation portions 4b of both the operation handles 4 in the direction for bringing them close to each other, the side frames 3 is rotated, and this rotation causes the fixing screws 14 mounted to the operation shafts 3e to move inwardly within the guide holes 13a, thereby gradually widening the opening and closing angle θ between both the side frames 3. When the fixing screws 14 are in contact with the inner ends of the guide holes 13a, the operation portions 4b cannot be rotated in the direction for bringing them further close to each other, and thus the side frames 3 are restricted at the maximum opening angle at those positions. On the other hand, when the operator operates the operation portions 4b of both the operation handles 4 in the direction for bringing them away from each other, the side frames 3 is rotated, and this rotation causes the fixing screws 14 mounted to the operation shafts 3e to move outwardly within the guide holes 13a, thereby gradually narrowing the opening and closing angle θ between both the side frames 3. When the fixing screws 14 are in contact with the outer ends of the guide holes 13a, the operation portions 4b cannot be rotated in the direction of bringing them further away from each other, and thus both the side frames 3 are restricted at the minimum opening angle at those positions.

The spray nozzles 5 are mounted on the pair of upper shafts 2 which is parallel to the ground, and for example, the number of the spray nozzles 5 to be mounted is two. The spray nozzles 5 are connected to hoses 15, respectively. The hoses 15 merge at the center of the upper shaft 2 provided at the rear side, and a liquid solution tank (not illustrated) filled with an herbicide is connected to the ends of the hoses 15 which are led out from the upper shaft 2. Note that the number of spray nozzles 5 to be mounted can be as many as required, and for example, may be only one.

Figure 5:
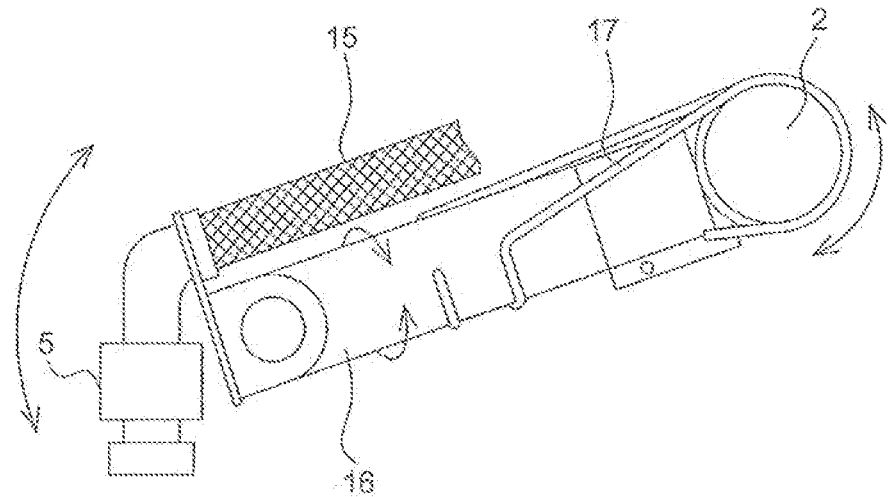
FIG. 5 is a side view illustrating a mounting structure of a spray nozzle.

As illustrated in FIG. 5, each of the spray nozzles 5 is mounted to the end of a support cylinder 16 projecting forward or downward from the upper shaft 2 provided at the rear side. The rear end of the support cylinder 16 is in contact with the outer circumference of the upper shaft 2, and is held to the upper shaft 2 by the spring force of a wire forms 17. Loosening the wire forms 17 allows the support cylinder 16 to move in the lateral direction along the upper shaft 2, and also allows the support cylinder 16 to rotate around the axis of the upper shaft 2 as well as rotate around its own axis. This enables the rotation of a head portion of each of the spray nozzles 5 in the up and down direction, thereby enabling free adjustment of the spray directions of the spray nozzles 5 mounted to the support cylinders 16.

The cover sheet 7 is mounted to the pair of upper shafts 2 and both the side frames 3 so as to cover the five faces of the box-shaped frame body formed with the upper shafts 2 and the side frames 3, except the bottom face thereof. That is, the cover sheet 7 covers the left and right side face region where the pair of side frames 3 are arranged, the front face region surrounded by the upper shaft 2 provided at the front side and the pair of vertical shafts 3*b*, the rear face region surrounded by the upper shaft 2 provided at the rear side and the pair of vertical shafts 3*c*, and the top face region surrounded by the pair of upper shafts 2 and the pair of rotation shafts 3*a*, respectively. Here, the area of the front face region surrounded by the upper shaft 2 provided at the front side and the pair of vertical shafts 3*b* and the area of the rear face region surrounded by the upper shaft 2 provided at the rear side and the pair of vertical shafts 3*c* change in accordance with an operation for opening and closing both the side frames 3, and thus the portions of the cover sheet 7 which cover these front and rear face regions need to be large enough to correspond to the change in area.

Figure 6:
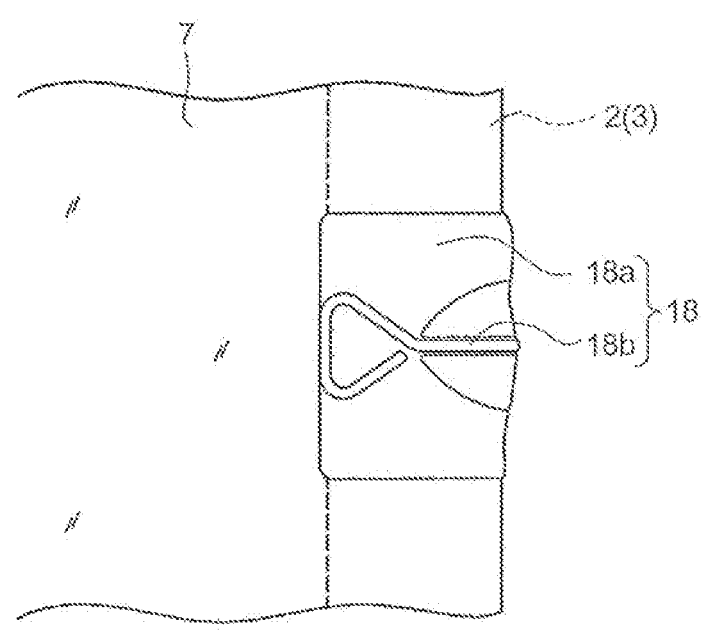
FIG. 6 is a plan view illustrating a mounting structure of a cover sheet.
Figure 7:
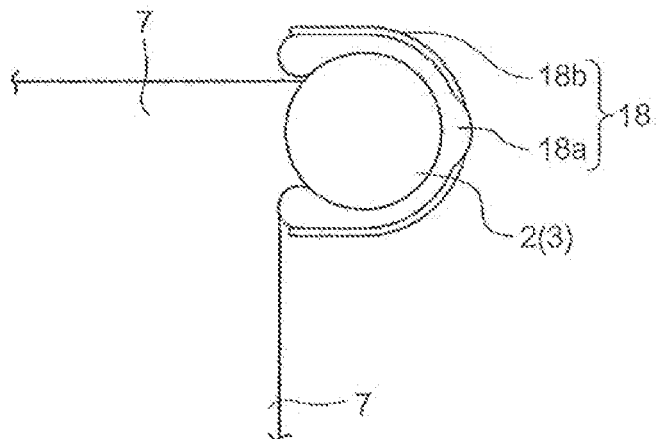
FIG. 7 is a side view illustrating a mounting structure of a cover sheet.

The cover sheet 7 is obtained by cutting a transparent vinyl sheet into a predetermined size, and is fixed to the upper shafts 2 and the side frames 3 at arbitrary positions using a plurality of stoppers 18. As illustrated in FIG. 6 and FIG. 7, each of the stoppers 18 includes a cylindrical body 18*a* which is made of plastic and open on one side, and a wire spring 18*b* mounted to the cylindrical body 18*a*. The stoppers 18 are mounted to the upper shafts 2 and the side frames 3 which are round pipe members in a removable manner. The cover sheet 7 is covered on the upper shafts 2 and the side frames 3 and then the stoppers 16 are fitted to the upper shafts 2 and the side frames 3 from the outside, whereby the cover sheet 7 can be fixed to the upper shafts 2 and the side frames 3 easily and firmly. Both the cover sheet 7 and the stoppers 18 are agricultural materials used in agricultural vinyl greenhouses. The cover sheet 7 is an agricultural vinyl film for covering an agricultural vinyl greenhouse, and the stoppers 18 are called locking clips for fixing the agricultural vinyl film to support poles of the vinyl greenhouse.

Next, a method of using the herbicide spreader 1 according to the present embodiment will be described with reference to FIG. 8.

Figure 8:
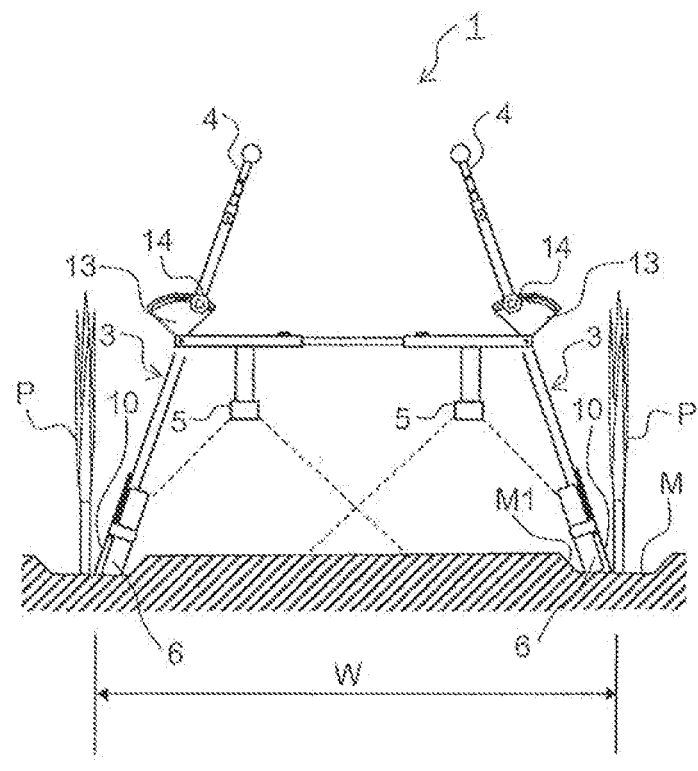
FIG. 8 is a diagram for explaining an aspect of use of the herbicide spreader.

In FIG. 8, a reference sign P indicates crops (for example, Japanese leeks) planted in a field, and the herbicide spreader 1 according to the present embodiment is used to spread the herbicide, for example, on a soil surface between the crops P planted in rows.

The length of the upper shafts 2 is adjusted in advance to be less than the width dimension W between the crops P, and then the herbicide spreader 1 is placed on the soil between the crops P with the interval between the left and right wheels 6 being adjusted to the width dimension W between the crops P. At this time, the opening and closing angle θ between the side frames 3 is adjusted in accordance with the growth of the crops P. Specifically, when the crops P have grown significantly, increasing the tilt angle of each of the side frames 3 with respect to the soil surface allows the lower ends of the cover auxiliary plates 10 to enter the areas near the roots of the crops P. On the other hand, when the crops P are small, the lower ends of the cover plates 10 can enter the areas near the roots of the crops P without increasing the tilt angle of each of the side frames 3 with respect to the soil surface, and thus the tilt angle of each of the side frames 3 is adjusted with priority given to ease of weeding.

Then, the fixing screws 14 are tightened to fix the positions of the operation handles 4, however, in order to freely adjust the opening and closing angle θ between both the side frames 3 during traveling, the fixing screws 14 are loosened to allow the operation handles 4 to be freely rotated. In this state, the fixing of the positions of the operation handles 4 can be released by loosening of the fixing screws 14, thereby enabling easy adjustment of the opening and closing angle θ between the side frames 3 even during spreading the herbicide.

To start spreading the herbicide, an operator connects the liquid solution tank filled with the herbicide to the ends of the hoses 15, carries a power sprayer or a manual sprayer equipped with the liquid solution tank on his or her back, holds the operation handles 4, and makes the herbicide spreader 1 travel along between the crops P while operating a pump (not illustrated) to spray the herbicide from the spray nozzles 5. At this time, since the cover sheet 7 is mounted to all the five faces of the box-shaped frame body except the bottom face thereof so as to surround the spray nozzles 5, the portions of the cover sheet 7 which cover both the side frames 3 can prevent splashing of the herbicide onto the crops P. Furthermore, even in a windy work environment, the cover sheet 7 mounted as described above prevents the herbicide blown by the wind from being flown out from the front, rear, and upper portions of the frame main body beyond the cover sheet 7. This reliably prevents the crops P and the operator from being exposed to the herbicide.

Still further, adjusting the cover auxiliary plates 10 mounted to the connection members 3*d* of both the side frames 3 in the up and down direction can close the gaps between the connection members 3*d* and the soil. This enables spreading of the herbicide to the soil near the roots of each of the crops P. In addition, providing both the cover sheet 7 for covering both the side frames 3 and the cover auxiliary plates 10 further improves the shielding effect to the herbicide which may be splashed to the crops.

Here, the distance between the crops P in the rows to be spread with the herbicide does not always extend straight with constant width, and in many crop rows, the width dimension W between the crops P in the rows varies along the direction of movement of the herbicide spreader 1. In such cases, when the fixing screws 14 has been tightened and the opening and closing angle θ between the side frames 3 is fixed, loosening the fixing screws 14 and operating to rotate both the operation handles 4 in the direction for bringing them close to or away from each other enables adjustment of the interval between the left and right wheels 6 to the width dimension W between the crops P. On the other hand, when the fixing screws 14 are not tightened and thus the opening and closing angle θ between the side frames 3 can be freely adjusted, operating each of the operation handles 4 enables adjustment of the interval between the left and right wheels 6 to the width dimension W between the crops P without loosening the fixing screws 14.

For example, when the width dimension W between the crops P is greatly large, the operator operates both the operation handles 4 in the direction for bringing them close to each other, whereby both the side frames 3 are rotated outwardly about the bolts 9. This increases the opening and closing angle θ between both the side frames 3 in accordance with the width dimension W between the crops P. On the other hand, when the width dimension W between the crops P is narrow, the operator operates both the operation handles 4 in the direction for bringing them apart from each other, whereby the side frames 3 are rotated inwardly about the bolts 9. This decreases the opening and closing angle θ between both the side frames 3 in accordance with the width dimension W between the crops P.

The operator can adjust the opening and closing angle θ between both the side frames 3 in the manner as described above even when the fixing screws 14 has been tightened and the opening and closing angle θ between the side frames 3 is fixed. During spreading the herbicide, the operator stops to loosen the fixing screws 14, operates both the operation handles 4 to adjust the interval between the wheels 6 to the width dimension W between the crops P, and then tighten the fixing screws 14 again, thereby allowing the operator to continue spreading of the herbicide by the herbicide spreader 1. When the fixing screws 14 has not been tightened and the opening and closing angle θ between the side frames 3 can be freely adjusted, the operator does not have to stop traveling of the herbicide spreader 1 nor spreading of the herbicide, in other words, does not have to interrupt an operation for spreading the herbicide once. Thus, the operator can adjust the opening and closing angle θ between the side frames 3 while continuing spreading of the herbicide.

In the herbicide spreader 1 according to the present embodiment, the wheels 6 are mounted to the portions protruding further forward than the rotation shafts 3a of the connection members 3d of both the side frames 3. This allows the operator, who is holding both the operation handles 4 and making the herbicide spreader 1 travel, to see the wheels 6 with his or her eyes and use them as positioning markers. Thus, the operator can make the herbicide spreader 1 travel while adjusting the interval between the wheels 6 to make it correspond to the width dimension W between the crops P.

In particular, when the growth of the crops P is small, shifting the position of each of the spray nozzles 5 outwardly to direct the spraying direction of each of the spray nozzles 5 inwardly enables spreading of the herbicide toward an inner sloping surface M1 of a trench M where the crops P are planted. On the other hand, when the crops P grow to a large size, the sloping surface M1 of the trench M collapses and then the sloping gradually becomes gentle as the crops P grow, and thus the herbicide can be spread toward the inner sloping surface M1 of the trench M without directing the spraying direction of each of the spray nozzles 5 outwardly.

The direction in which the herbicide spreader 1 travels may be reversed from the direction described above so that the herbicide spreader 1 travels toward the rear side of FIG. 1 against the wheels 6. In this case, the herbicide is spread from the spray nozzles 5 behind the operator who is moving, which advantageously allows the operator not to walk on the soil covered with the herbicide.

As described above, according to the herbicide spreader 1 of the present embodiment, the operator holds the pair of operation handles 4 and makes the wheels 6 mounted to the left and right side frames 3 travel while spreading the herbicide from the spray nozzles 5, thereby spreading the herbicide only toward the soil of the portions between both the side frames 3 while protecting the crops P from the herbicide sprayed from the spray nozzles 5. When the width dimension W between the crops P on which the herbicide spreader 1 travels changes, the operator operates both the operation handles 4 in the direction for bringing them close to or away from each other to cause both the side frames 3 to rotate about the bolts 9 serving as the connections with the upper shafts 2, thereby enabling easy adjustment of the opening and closing angle θ between both the side frames 3 in accordance with the width dimension W between the crops P. In addition, even in a windy working environment, the cover sheet 7 covering not only the side frames 3 but also all the surroundings of the spray nozzles 5 can prevent the herbicide blown by the wind from splashing out from the front, rear, and upper side of the herbicide spreader 1 toward the surroundings. This can reliably prevent the surrounding crops and operators from being exposed to the herbicide.

In addition, since the length of the pair of upper shafts 2 is adjustable, even when the width dimension W between the crops P varies depending on the type of the planted crops P, the width dimension of the entire herbicide spreader 1 can be easily changed in accordance therewith. In such a case, since a flexible agricultural vinyl film is used as the cover sheet 7, mounting the cover sheet 7 having the enough size to the upper shafts 2 enables adjustment of the length of the upper shafts 2 without replacing the cover sheet 7.

Furthermore, the guide holes 13a extending in the circular arc shape about the bolts 9 serving as points of rotation of the operation handles 4 are formed in the brackets 13 fixed to both ends of the upper shaft 2 provided at the rear side. Tightening the fixing screws 14 inserted into the guide holes 13a with respect to the operation handles 4 fixes the operation handles 4 to the brackets 13. In this structure, the opening and closing angle θ between the pair of side frames 3 is restricted within a predetermined range, and thus it is possible to reliably prevent both the side frames 3 from being closed too much inwardly and then falling down, or from being opened too much outwardly and then causing damage to the crops P.

When the fixing screws 14 are tightened, the herbicide spreader 1 can travel in the state where the opening and closing angle θ between both the side frames 3 is fixed. On the other hand, when the fixing screws 14 are loosened, the guide holes 13a which are slits consecutive in the circular arc shape enables the operator to easily adjust the opening and closing angle θ between both the side frames 3 while making the herbicide spreader 1 travel.

Even when the crops P grow largely, adjusting the length of the upper shafts 2 to be short to increase the tilt angles of the side frames 3 with respect to the soil surface so as to allow the lower ends of the cover plates 10 to touch the soil surface prevents the cover auxiliary plates 10 from being in contact with the crops P while allowing the lower ends of the cover auxiliary plates 10 to enter the positions close to the roots of the crops P. This realizes accurate spreading of the herbicide by the herbicide spreader 1 in accordance with the growth of the crops P.

Each of the side frames 3 has a frame structure including the combination of the rotation shaft 3*a* rotatably connected to the upper shafts 2, the vertical shaft 3*b* mounted to the front end of the rotation shaft 3*a* and extending vertically downward, the vertical shaft 3*c* mounted to the rear end of the rotation shaft 3*a* and extending vertically downward, the connection member 3*d* fixed to the lower ends of both the vertical shaft 3*b* and the vertical shaft 3*c* and extending in the front and rear direction, and the operation shaft 3*e* integrally connected to the upper end of the vertical shaft 3*c*. The wheels 6 are mounted to the connection members 3*d* of the left and right side frames 3, respectively, thereby allowing both the side frames 3 to travel smoothly.

Each of the connection members 3*d* of the side frames 3 has protrusions which protrude further than the rotation shaft 3*a* in the front and rear direction, and the wheels 6 are mounted to the protrusions, respectively. This enables the operator to see the wheels 6 positioned further forward of the rotation shafts 3*a* and use the wheels 6 as positioning markers. Accordingly, the operator can make the herbicide spreader 1 easily travel along between the crops P while adjusting the interval between the wheels 6 to the width dimension W between the crops P.

Providing the cover auxiliary plates 10 which are mounted to both the side frames 3 to cover the gaps between the connection members 3*d* and the soil can improve the shielding effect to the herbicide which may be splashed on the crops. In addition, changing the adjustable mounting height of the cover auxiliary plates 10 in accordance with the tilt angles of both the side frames 3 reduces or eliminates the gaps between the cover auxiliary plates 10 and the soil. This enables accurate spreading of the herbicide so as to reach the area very close to the roots of the crops P.

All the rotation shafts 3*a* and both the vertical shafts 3*b*, 3*c* of both the side frames 3 and the pair of upper shafts are round bars or pipes to which the stoppers 18 can be mounted and have the outer diameter dimensions corresponding to those of poles of agricultural plastic greenhouses. In addition, an agricultural vinyl film which has been cut to a predetermined size is used as the cover sheet 7, and this agricultural vinyl film is fixed to the upper shafts 2 and both the side frames 3 at any position using the plurality of stoppers 18. The cover sheet (agricultural vinyl film) 7 and the stoppers (locking clips) 18 are agricultural materials commonly used for agricultural plastic greenhouses, thereby allowing the stoppers 18 to be attached and detached without using tools.

In particular, for farmers who are familiar with such agricultural materials, it is easy to handle the cover sheet 7 and the stoppers 18. Using such familiar agricultural materials enables them to easily and repeatedly stretch, remove, and re-stretch the cover sheet 7 in a field (worksite) where the herbicide is being spread.

The embodiment described above is an example used to describe the present invention, and various modifications are included in the present invention. For example, in the embodiment described above, the liquid spreader has been described as an apparatus for spreading an herbicide on the soil surface between the crops P such as Japanese leeks. On the other hand, the liquid spreader according to the present invention can be used as an apparatus for spreading a liquid over the longitudinal direction in a place having a predetermined width dimension but partially having a different width dimension.

Figure 9:
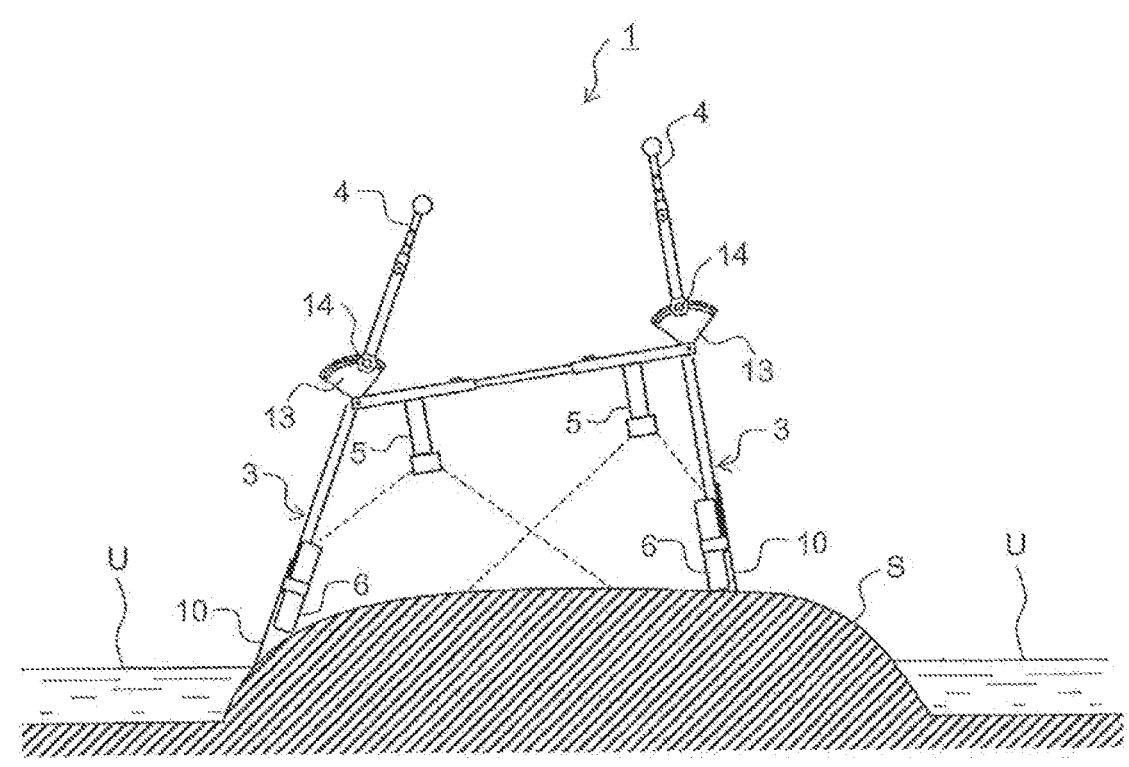
FIG. 9 is a diagram for explaining one of other aspects of use of the herbicide spreader.

Specifically, each of the pair of side frames 3 is fixed to the corresponding one of the upper shafts 2 at a single point, and thus the opening and closing degree of the pair of side frames 3 can be made different, respectively, and the opening and closing angle is thus made asymmetrical in accordance with the shape of any slope surface to which the herbicide is to be spread. For example, as illustrated in FIG. 9, in the case of spreading a liquid such as an herbicide or insecticide on a surface of a ridge S that divides a paddy field U, making the opening and closing degree of one of the side frames and that of the other one of the side frames different to each other enables spreading of the liquid such as an herbicide or insecticide on the ridge S so as to reach the areas very close to the paddy field U. Furthermore, a liquid such as an herbicide can be spread between ridges in a field, or a liquid such as an insecticide or disinfectant can be spread in passageways of a cowshed.

Figure 10:
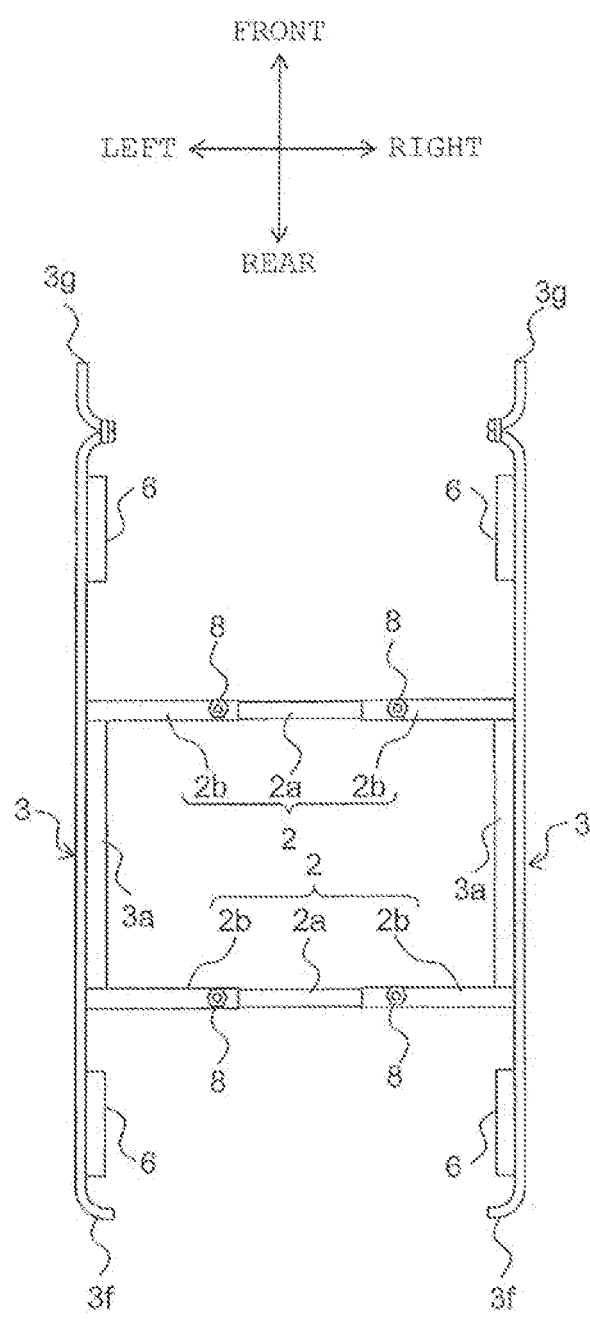
FIG. 10 is a plan view of an herbicide spreader according to one of other embodiments of the present invention.

Furthermore, as illustrated in FIG. 10, arcuately curved enclosure pieces 3*g* may be mounted to the edges of the guard portions 3*f* of the connection members 3*d*, respectively. The enclosure pieces 3*g* protrude along the outer surfaces of the connection members 3*d*. The enclosure pieces 3*g* allow objects (weeds) to which an herbicide is to be spread to be taken between the pair of connection members 3*d*, in other words, taken into a region where the herbicide is to be spread. That is, providing the enclosure pieces 3*g* enables effective weed removing, for example, even in the event where the weeds to be removed have grown to a certain extent.

Figure 11:
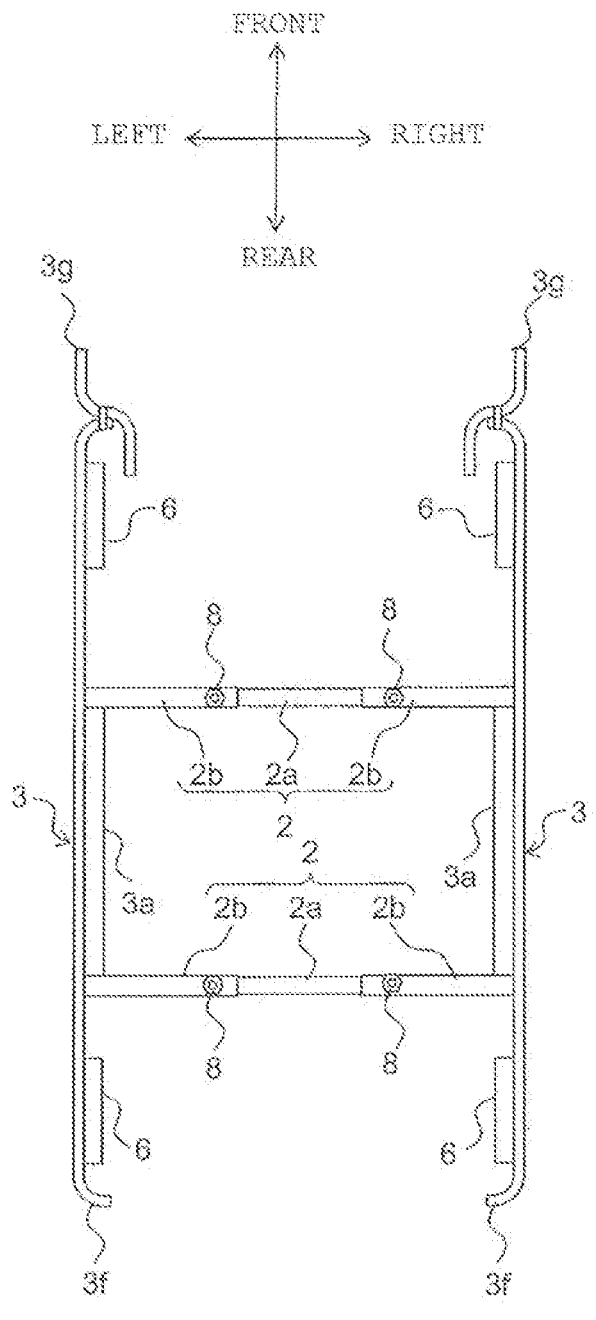
FIG. 11 is a plan view of an herbicide spreader according to further one of other embodiments of the present invention.

Still further, as illustrated in FIG. 11, extending the base end of each of the mounting pieces 3*g* and making it a symmetrical shape curved in a circular arc enables the weeds to be taken between the pair of connection members 3*d*, in other words, taken into the region where the herbicide is to be spread, and also prevents the weeds from getting entangled in the wheels 6.

Still further, the cover sheet 7 may be divided into three sheets so that a portion including the top face region surrounded by the pair of upper shafts 2 and the pair of rotation shafts 3*a* and the left and right side face region where the pair of side frames 3 are arranged is covered with one of the sheets, the front face region surrounded by the upper shaft 2 provided at the front side and the pair of vertical shafts 3*b* is covered with another one of the sheets, and the rear face region surrounded by the upper shaft 2 provided at the rear side and the pair of vertical shafts 3*c* is covered with the other one of the sheets. The cover sheet 7 may be divided into five sheets so that the top face region, left side face region, right side face region, front face region, and rear face region are covered with the five sheets one by one, respectively.

Still further, in the embodiments described above, the rotation shafts 3*a*, both the vertical shafts 3*b*, 3*c*, and the operation shafts 3*e* of the side frames 3 and the upper shafts 2 are aluminum round bars or round pipes, however, they may be formed with square pipes instead of using round pipes, or may be made of stainless steel, iron, resin, and the like other than aluminum. As materials of the connection members 3*d*, square pipes or the like can be used instead of using plate members.

Still further, in the embodiments described above, the cover sheet 7 is mounted to the upper shafts 2 and the side frames 3 so as to cover the five faces of the box-shaped frame main body formed with the pair of upper shafts 2 and both the side frames 3, except the bottom face. On the other hand, it is sufficient that the cover sheet 7 covers at least the two faces of the left and right side regions where the side frames 3 are arranged. Although the shielding effect to an herbicide by the cover sheet 7 is somewhat reduced, the top face region between the pair of upper shafts 2 and the front face region and rear face region of the frame main body may not be covered with the cover sheet 7.

Still further, in the embodiments described above, the wheels 6 are mounted at four positions, namely, on the front, rear, left and right of both the side frames 3, respectively, and these four wheels 6 are used for traveling of the herbicide spreader 1. However, the number of wheels 6 to be mounted is not limited to four, and the wheels 6 may be mounted one by one on the front side or rear side of each of the side frames 3. The wheels 6 may not be provided if making the herbicide spreader 1 move with both the side frames 3 in contact with the ground.

Still further, in the embodiments described above, both the ends of the connection members 3*d* are formed as protrusions which protrude in the front and rear direction so as to allow the wheels 6 to be viewed and used as positioning markers. On the other hand, for example, in the case of using the herbicide spreader 1 for spreading an herbicide in a narrow space such as the inside of an agricultural vinyl greenhouse, both the ends of the connection members 3*d* may not be protruded in the front and rear direction but the connection members 3*d* are formed to be slightly longer than the dimension between the vertical shafts 3*b*, 3*c*.

REFERENCE SIGNS LIST 1 herbicide spreader (liquid spreader)
2 upper shaft
2*a* small-diameter round bar
2*b* large-diameter pipe
3 side frame
3*a* rotation shaft
3*b*, 3*c* vertical shaft
3*d* connection member
3*e* operation shaft
4 operation handle
4*b* operation portion.
4*c* grip portion
5 spray nozzle
6 wheel
7 cover sheet
8 fixing screw
9 bolt
10 cover auxiliary plate
10*a* slit
11 fixing screw
12 fixing screw
13 bracket
13*a* guide hole
14 fixing screw
15 hose
16 support cylinder
17 wire forms
18 stopper
18*a* cylindrical body
18*b* wire spring

The invention claimed is:

1. A liquid spreader comprising:
first and second upper shafts extending in a left and right direction having a predetermined interval therebetween in a front and rear direction;
a first-side frame connected to a first side of the first upper shaft and a first side of the second upper shaft;

a second side frame connected to a second side of the first upper shaft and a second side of the second upper shaft;
first and second bar-shaped operation handles, wherein the first operation handle is fixed on the first side frame and the second operation handle is fixed on the second side frame; and
a spray nozzle that sprays a liquid into a space between the first and second side frames; wherein
the first operation handle is configured to rotate about a longitudinal axis of the first side frame, the longitudinal axis of the first side frame extending in the front and rear direction, whereby a rotational angle of the first side frame about the longitudinal axis of the first side frame is adjusted, and the second operation handle is configured to rotate about a longitudinal axis of the second side frame, the longitudinal axis of the second side frame extending in the front and rear direction, whereby a rotational angle of the second side frame about the longitudinal axis of the second side frame is adjusted, and
a distance between the first operation handle and the second operation handle changes along with at least one of (i) a change of the rotational angle of the first side frame and (ii) a change of the rotational angle of the second side frame.

2. The liquid spreader according to claim 1, further comprising:
at least one cover sheet that covers:
the first and second side frames,
a front region surrounded by (i) the first upper shaft which is positioned on a front side and (ii) the first and second side frames, and
a rear region surrounded by (i) the second upper shaft which is positioned on a rear side and (ii) the first and second side frames.

3. The liquid spreader according to claim 2, wherein the at least one cover sheet further covers a space between the first upper shaft and the second upper shaft.

4. The liquid spreader according to claim 1, further comprising angle fixing brackets capable of fixing an opening and closing angle between the first and second side frames at a predetermined angle.

5. The liquid spreader according to claim 4, wherein:
the first operation handle and the second operation handle are each connected to a respective one of the angle fixing brackets,
the angle fixing brackets include a first bracket fixed to the first upper shaft and a second bracket fixed to the second upper shaft,
the first bracket includes a first guide hole that extends in a circular arc shape about the longitudinal axis of the first side frame, and a first fixing screw inserted into the first guide hole to fix the first operation handle to the first bracket, and
the second bracket includes a second guide hole that extends in a circular arc shape about the longitudinal axis of the second side frame, and a second fixing screw inserted into the second guide hole to fix the second operation handle to the second bracket.

6. The liquid spreader according to claim 5, wherein the guide hole is a slit that is continuous along the circular arc shape.

7. The liquid spreader according to claim 2, wherein the first and second side frames each include (i) a rotation shaft rotatably connected to the first and second upper shafts, (ii) a pair of vertical shafts extending downward from the rotation shaft, and (iii) a connection member connecting lower ends of the vertical shafts, and a plurality of wheels is mounted to each connection member.

8. The liquid spreader according to claim 7, wherein each connection member includes a first protrusion protruding further than a first end of the rotation shaft in the front and rear direction and a second protrusion protruding further than a second end of the rotation shaft in the front and rear direction, and each wheel of the plurality of wheels is mounted to a respective one of the protrusions.

9. The liquid spreader according to claim 7, wherein each side frame of the pair of side frames includes a cover auxiliary plate mounted for covering a gap between (i) a surface on which the liquid is spread and (ii) a respective one of the connection members.

10. The liquid spreader according to claim 2, wherein each cover sheet of the at least one cover sheet is an agricultural vinyl film, and the agricultural vinyl film is fixed to the first and second upper shafts and the first and second side frames using a plurality of stoppers.

\* \* \* \* \*